United States Patent
Vogler et al.

(10) Patent No.: US 8,192,106 B2
(45) Date of Patent: Jun. 5, 2012

(54) LIGHTWEIGHT HEAVY DUTY BUSHING WITH EASY ASSEMBLY

(75) Inventors: Richard Gregory Vogler, Naperville, IL (US); Michael Brannigan, Narbeth, PA (US); Ashley Thomas Dudding, Plainfield, IL (US); Christopher Wayne Forrest, Auburn, IN (US)

(73) Assignee: Hendrickson USA, LLC., Itasca, IL (US)

( * ) Notice: Subject to any disclaimer, the term of this patent is extended or adjusted under 35 U.S.C. 154(b) by 0 days.

(21) Appl. No.: 12/858,830

(22) Filed: Aug. 18, 2010

(65) Prior Publication Data

US 2011/0127746 A1    Jun. 2, 2011

Related U.S. Application Data

(63) Continuation of application No. 11/849,731, filed on Sep. 4, 2007, now abandoned.

(51) Int. Cl.
*F16D 1/072* (2006.01)
(52) U.S. Cl. ......... 403/372; 403/280; 403/282; 267/293
(58) Field of Classification Search .......... 403/365–369, 403/372, 280, 282; 267/276, 293
See application file for complete search history.

(56) References Cited

U.S. PATENT DOCUMENTS

| | | | |
|---|---|---|---|
| 3,000,656 A | 9/1961 | Hollaender |
| 4,111,577 A | 9/1978 | Kiyosawa |
| 4,792,256 A | 12/1988 | Batchelor |
| 4,916,749 A | 4/1990 | Urban et al. |
| 5,417,499 A | 5/1995 | Jacques et al. |
| 5,788,265 A | 8/1998 | McLaughlin |
| 6,945,728 B2 | 9/2005 | Woodard et al. |
| 2004/0084822 A1 | 5/2004 | Collyer et al. |
| 2006/0163788 A1 | 7/2006 | Kiddle |
| 2006/0180967 A1 | 8/2006 | Adema et al. |
| 2006/0214341 A1 | 9/2006 | Sugiura et al. |
| 2006/0231993 A1 | 10/2006 | Collyer et al. |
| 2007/0290425 A1 | 12/2007 | Heuer et al. |

*Primary Examiner* — Joshua Kennedy
(74) *Attorney, Agent, or Firm* — Cook Alex Ltd.

(57) ABSTRACT

A lightweight heavy duty bushing assembly for use in a vehicle suspension system and being low cost and having a high assembly tolerance is disclosed. A metal bar pin is press fit into a bushing formed from a metal sleeve bonded to an elastomeric housing. The metal sleeve is deformable such that exact tolerances of the metal sleeve and the bar pin are not required. The metal bar pin has extended ends with a hole in each end for attachment of the metal bar pin to vehicle suspension components, mounting brackets, or to the vehicle frame.

20 Claims, 4 Drawing Sheets

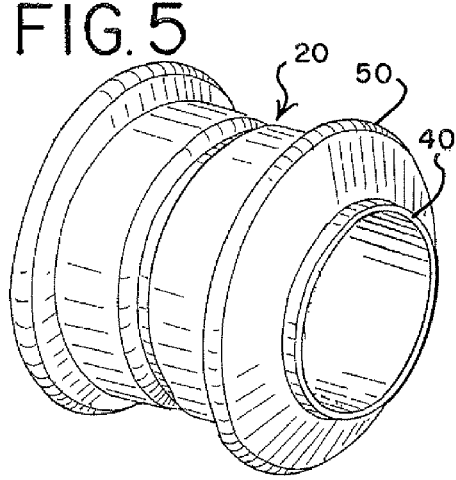
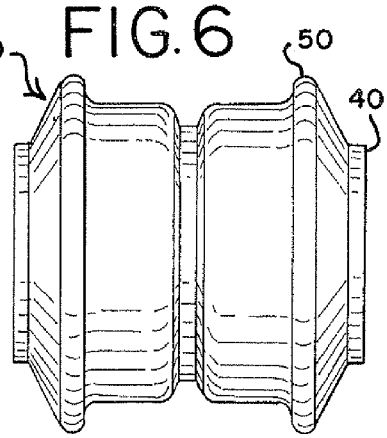
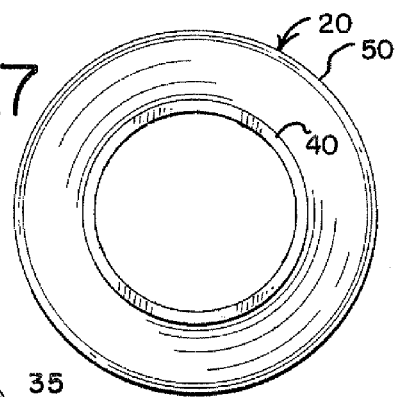
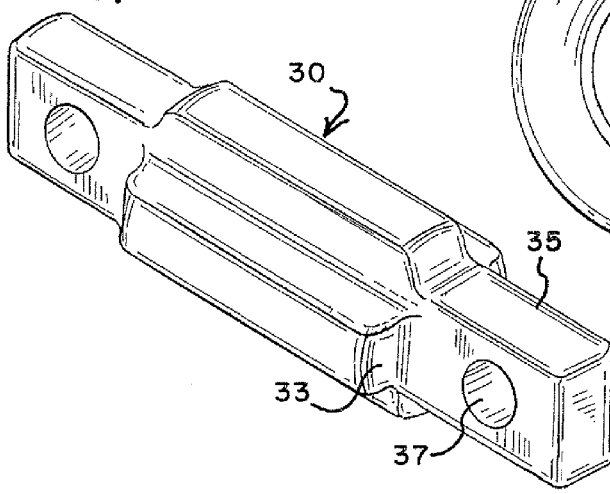
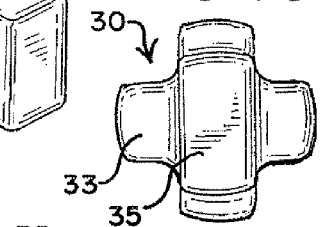
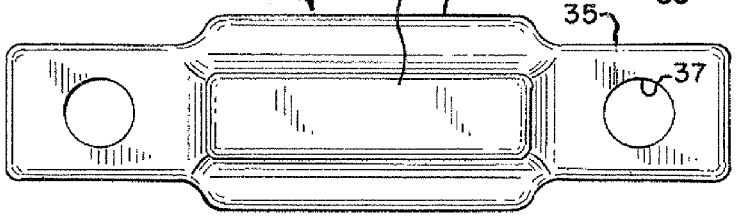

LIGHTWEIGHT HEAVY DUTY BUSHING WITH EASY ASSEMBLY

CROSS-REFERENCE TO RELATED APPLICATIONS

This application is a continuation application of U.S. patent application Ser. No. 11/849,731, filed Sep. 4, 2007 now abandoned, and claims the benefit of priority of the filing date of U.S. patent application Ser. No. 11/849,731. The full disclosure of U.S. patent application Ser. No. 11/849,731 is hereby incorporated herein by reference.

BACKGROUND OF THE INVENTION

The present invention is generally directed to bushing assemblies in vehicle suspension systems. More specifically, the present invention is directed to a unique construction of bushing assemblies used in vehicle suspension systems.

Vehicle suspension bushing assemblies are known. One such bushing assembly may be formed from a round inner metal bar pin that is an elongated piece of metal such as cast iron which is contained within a combination of a circular metal sleeve attached to an elastomeric material such as rubber. The circular metal sleeve and the round bar pin must be machined to very exact tolerances to properly fit together. The increased machining and processing of the components due to the required low tolerances increases costs. The circular bar pin may be heavy, which leads to increased material, manufacturing and shipping costs.

Another known bushing assembly may be formed from a round inner metal bar pin that is a machined length of metal such as aluminum that is bonded directly to an elastomeric material such as rubber. The direct bonding of the rubber to the inner metal bar pin requires specific types of metal and additional machining or processing to yield a proper bond between the inner metal and the rubber, thus increasing costs.

The combined inner metal bar pin bonded to a rubber bushing may also be inserted into a metal sleeve to form another known bushing assembly. The bushing assembly may have attachment means on both ends of the inner metal bar pin.

While prior vehicle suspension bushing assemblies have been adequate for certain purposes, they have lacked some of the advantages obtainable with the embodiments of the present invention. Many of these advantages are clearly described herein and others shall be readily apparent to those skilled in the art.

One advantage achieved by the present invention is the use of a deformable metal sleeve into which the metal bar pin is press fit.

Another advantage achieved by the present invention is by the use of low cost steel tube for the metal sleeve.

Another advantage achieved by the present invention is the use of an as-cast or near as-cast ductile inner metal bar pin that requires little or no machining or processing.

Another advantage achieved by the present invention is the lower costs achieved by the need for little or no machining of the inner metal bar pin.

Another advantage achieved by the present invention is the use of an inner metal bar pin with a non-circular cross section that has voids bounded by radially extending contact portions.

Another advantage achieved by the present invention is the lower cost of the reduced weight achieved by the use of an inner metal bar pin with a non-circular cross section with voids.

Another advantage achieved by the present invention is the lower cost of the reduced material required by the use of an inner metal bar pin with a non-circular cross section with voids.

Another advantage achieved by the present invention is the use of ductile cast iron for the metal bar pin.

Another advantage achieved by the present invention is the use of a process to insert the metal bar pin into the metal sleeve and rubber combination and to insert the resulting bushing assembly into a vehicle suspension component such as a torque rod in a single press fit operation.

Another advantage achieved by the present invention is by allowing the steel tube to deform into a non-circular shape during the press fit operation instead of requiring a precise tolerance to fit a uniform circular metal sleeve.

Another advantage achieved by the present invention is by controlling the amount of the steel tube deformation such that the bond line with the rubber component is not compromised.

Another advantage achieved by the present invention is designing a cruciform embodiment such that the press fit between the cruciform and the steel tube sleeve has two cruciform extension end surfaces in full contact with the steel tube and two cruciform extension end surfaces in only a line contact with the steel tube.

These and other advantages of the preferred forms of the invention will become apparent from the following description. It will be understood, however, that at apparatus could still appropriate the invention claimed herein without exhibiting each and every one of these advantages, including those gleaned from the following description. The appended claims, not any advantages recited or implied herein, define the subject matter of this invention. Any and all advantages are derived from the preferred forms of the invention, not necessarily the invention in general.

SUMMARY OF THE INVENTION

The present invention is directed to a vehicle suspension bushing assembly. A bushing assembly has a ductile inner metal bar pin with a center section having an optimized non-circular cross section with voids for maximum strength at minimum weight. The ductile inner metal bar pin has an extended end section on each side of the center section. Each extended end section of the ductile inner metal bar pin has a hole for means of attachment to other suspension components, mounting brackets, or to the vehicle frame. The ductile inner metal bar pin is press fit into a bushing comprised of an elastomeric material housing such as rubber bonded or otherwise secured to a metal sleeve such as a deformable steel tube. The resulting deformable steel tube after the press fit operation has a cross section that is non-circular. The press fit assembly has adequate frictional force such that the inner metal bar pin does not translate within the metal sleeve under service duty.

The present invention also allows the inner metal bar pin to be press fit into the metal sleeve and rubber bushing and to insert the entire bushing assembly into a vehicle suspension component such as a torque rod in a single one step operation.

In addition, other built-in features are available with the present invention.

BRIEF DESCRIPTION OF THE DRAWINGS

In the following detailed description, reference will frequently be made to the following drawings, in which like reference numerals refer to like components, and in which:

FIG. 5 is a perspective view of part of the bushing assembly shown in FIG. 1;

FIG. 6 is a side elevational view of the bushing shown in FIG. 5;

FIG. 7 is an end view of the bushing shown in FIG. 5;

FIG. 8 is a perspective view of an embodiment of a four point bar pin having a cruciform cross section constructed in accordance with the principles of the present invention;

FIG. 9 is a side elevational view of the bar pin shown in FIG. 8;

FIG. 10 is an end view of the bar pin shown in FIG. 8;

DETAILED DESCRIPTION OF THE PREFERRED EMBODIMENTS

Figure 1:
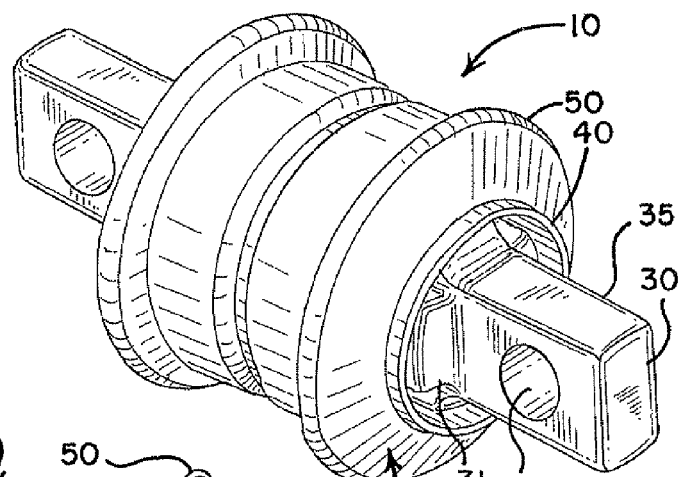
FIG. 1 is a perspective view of a lightweight heavy duty bushing assembly constructed in accordance with the principles of the present invention.
Figure 2:
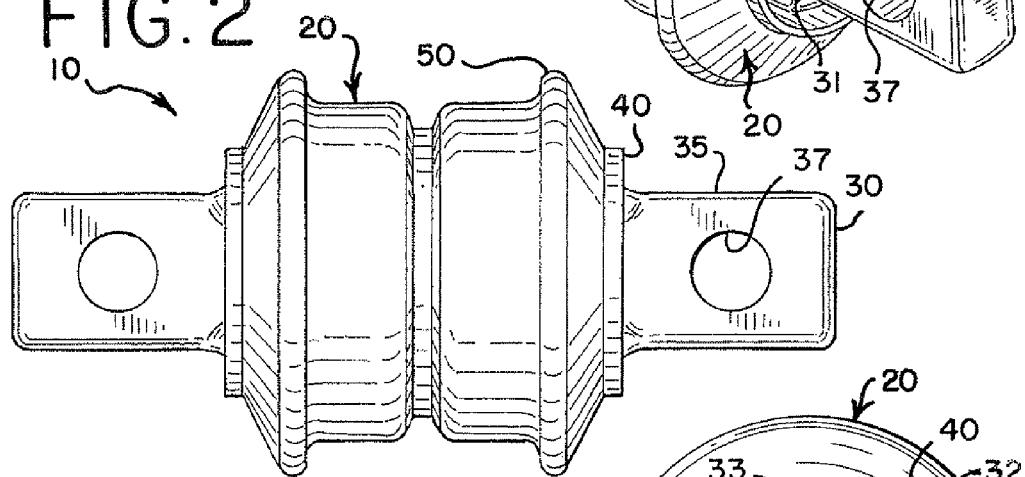
FIG. 2 is a side elevational view of the bushing assembly shown in FIG. 1.
Figure 3:
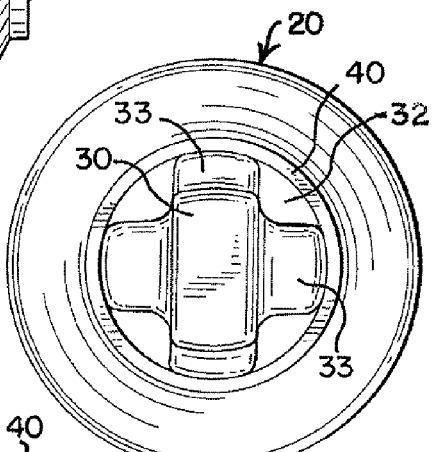
FIG. 3 is an end view of the bushing assembly shown in FIG. 1.
Figure 4:
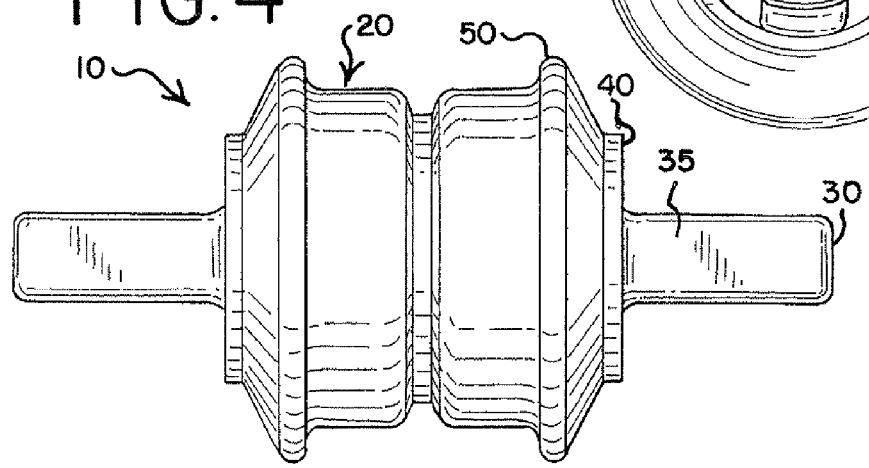
FIG. 4 is a top view of the bushing assembly shown in FIG. 1.

FIGS. 1-4 illustrate a lightweight heavy duty bushing assembly 10 for vehicle suspensions. A ductile inner metal bar pin 30 is press fit into a bushing 20. The ductile inner metal bar pin 30 has a central portion 31 with a cruciform cross-section that is comprised of voids 32 bounded by radially extending contact surfaces 33. The ductile inner metal bar pin 30 has an end portion 35 that extends beyond each end of the central portion 31. Each extended end portion 35 of the ductile inner metal bar pin 30 has a hole 37 through it for attachment to vehicle suspension components, mounting brackets, or to the vehicle frame (not shown). The ductile inner metal bar pin 30 is preferably cast of metal material, such as iron. Alternatively, the ductile inner metal bar pin 30 could be cast from other materials or the ductile inner metal bar pin 30 could be forged or machined from a variety of materials.

The bushing 20 is comprised of a metal sleeve 40 that is attached such as by bonding to an elastomeric housing 50 such as rubber. The elastomeric housing 50 is shaped to the desired dimensions by a process such as molding. The metal sleeve 40 may be made of a deformable metal such as steel.

FIGS. 5-7 illustrate an embodiment of the bushing 20. As previously noted, the bushing 20 may be comprised of a metal sleeve 40 that is bonded to an elastomeric housing 50. Alternatively, the entire bushing 20 may be formed from a single material by a process such as casting or molding. The cross section of the metal sleeve 40 prior to receiving the ductile inner metal bar pin 30 is generally circular as shown in FIG. 7.

FIGS. 8-10 illustrate an embodiment of the ductile inner metal bar pin 30. The ductile inner metal bar pin 30 has a central section with a four point or cruciform shape as shown in FIG. 10. The cross section of the ductile inner metal bar pin 30 is optimized to reduce weight and improve structural efficiency. The holes 37 in the extended end portions 35 of the ductile inner metal bar pin 30 are sized and positioned to provide appropriate means to attach the ductile inner metal bar pin 30 to vehicle suspension components or to the vehicle frame while maximizing the strength of the ductile inner metal bar pin 30.

Figure 11:
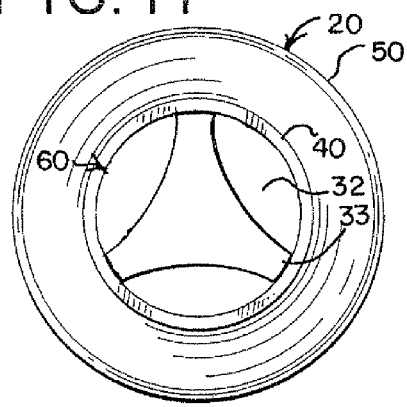
FIG. 11 is a sectional view of part of a bushing assembly having a three point alternative embodiment of a bar pin.

FIG. 11 illustrates a three point embodiment of the central section of a ductile inner metal bar pin 60 comprised of voids 32 bounded by radially extending contact surfaces 33 within a metal sleeve 40. The cross section of the ductile inner metal bar pin 60 is optimized to reduce weight and improve structural efficiency.

Figure 12:
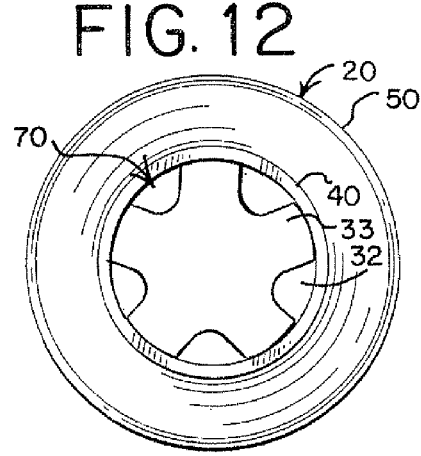
FIG. 12 is a sectional view of part of a bushing assembly having a five point alternative embodiment of a bar pin.

FIG. 12 illustrates a five point embodiment of the central section of a ductile inner metal bar pin 70 comprised of voids 32 bounded by radially extending contact surfaces 33 within a metal sleeve 40. The cross section of the ductile inner metal bar pin 70 is optimized to reduce weight and improve structural efficiency.

Figure 13:
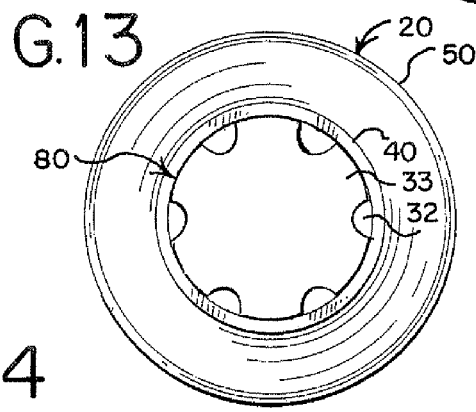
FIG. 13 is a sectional view of part of a bushing assembly having a six point alternative embodiment of a bar pin.

FIG. 13 illustrates a six point embodiment of the central section of a ductile inner metal bar pin 80 comprised of voids 32 bounded by radially extending contact surfaces 33 within a metal sleeve 40. The cross section of the ductile inner metal bar pin 80 is optimized to reduce weight and improve structural efficiency.

It is to be understood that FIGS. 11-13 are partial figures of the entire bushing assembly and that the embodiments illustrated in FIGS. 11-13 also contain an elastomeric housing bonded or otherwise secured to the metal sleeve.

Figure 14:
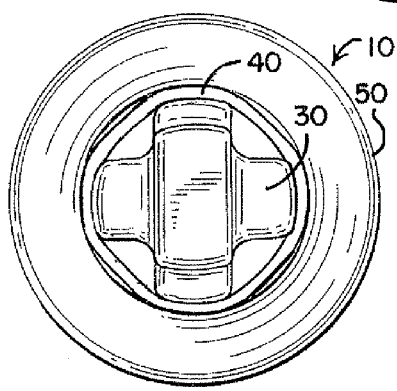
FIG. 14 is an end view of the bushing assembly shown in FIG. 1 better showing the as assembled condition.

FIG. 14 illustrates an embodiment of a lightweight heavy duty bushing assembly 10 where the press fit of the ductile inner metal bar pin 30 caused the metal sleeve 40 to deform from a circular cross section to a non-circular cross section, thus enabling a high tolerance between the components for assembly.

Figure 15:
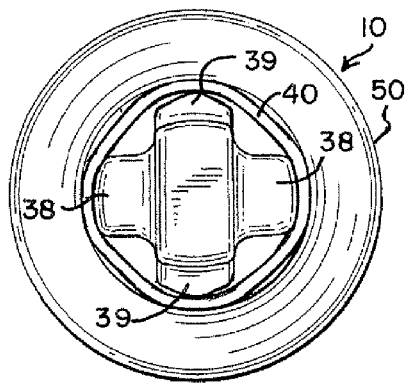
FIG. 15 is an end view similar to FIG. 14 better showing further details of a preferred as assembled condition.

FIG. 15 illustrates another embodiment of the lightweight heavy duty bushing assembly 10 shown in FIG. 14. Two of the cruciform extension end surfaces 38 are in full contact with the metal sleeve 40 and the other two cruciform extension end surfaces 39 make only a line contact with the metal sleeve 40. The ductile inner metal bar pin 30 is therefore structurally efficient in that the metal material is concentrated where it is needed to react to torque rod loads. Looser tolerances are thus permitted on the inner diameter of the metal sleeve 40 and the outer surfaces of the cruciform extension end surfaces 38, 39 allowing for easier assembly of the ductile inner metal bar pin 30 into the metal sleeve 40. Frictional forces between the ductile inner metal bar pin 30 and the metal sleeve 40 prevent translation of the ductile inner metal bar pin 30 within the metal sleeve 40 while under service duty or operation.

Figure 16:
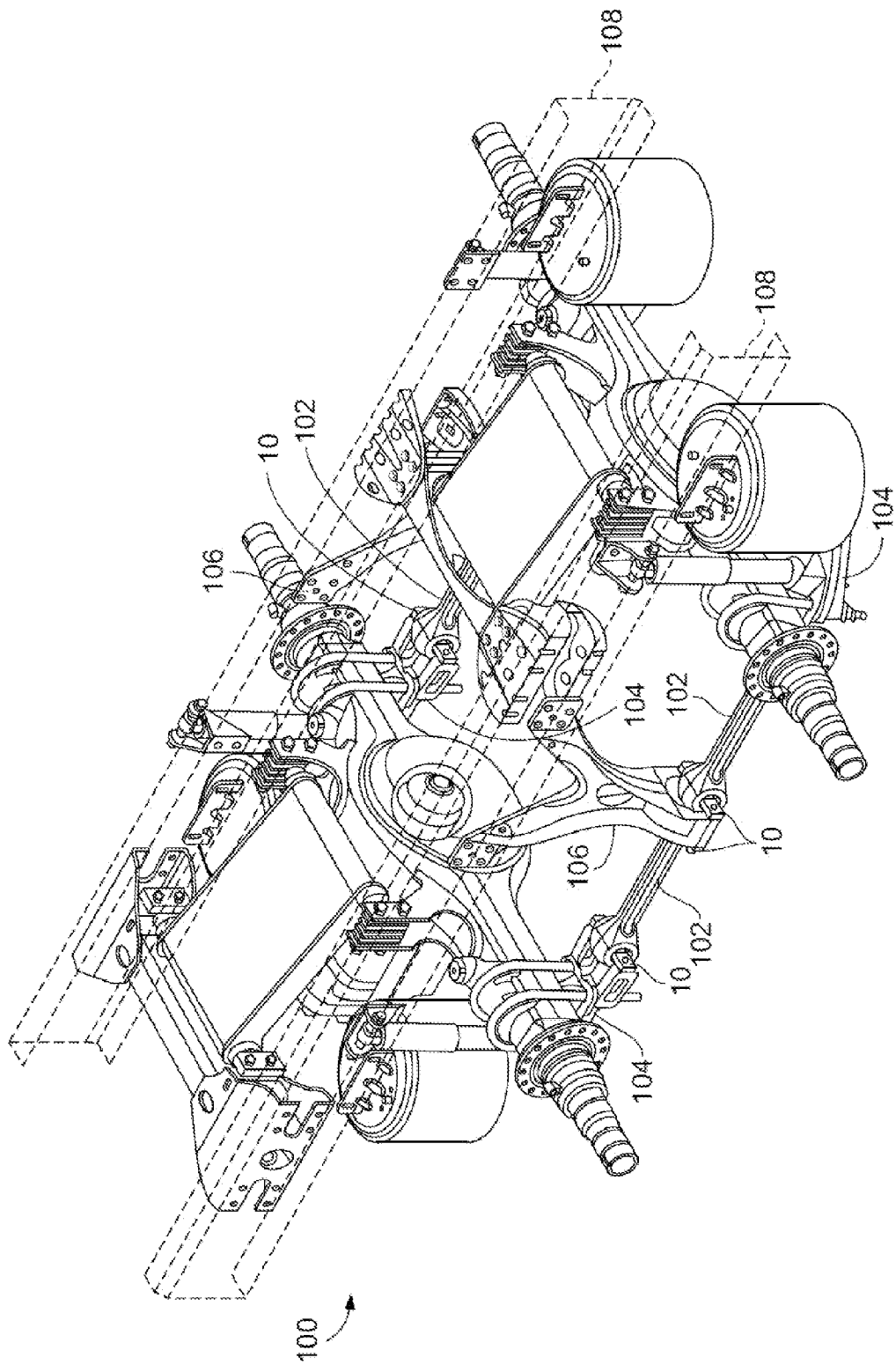
FIG. 16 is a perspective view of a vehicle suspension incorporating bushing assemblies according to the present disclosure.

FIG. 16 shows an exemplary vehicle suspension 100 which may employ bushing assemblies according to the present disclosure. The vehicle suspension 100 of FIG. 16 includes, among other things, a plurality of torque rods 102 each connected at one end to an axle or air spring bracket 104 and at the other end to a mounting bracket 106. An upper end of each mounting bracket 106 is fastened to the vehicle frame 108, thereby securing the vehicle suspension 100 to the vehicle frame 108. In the illustrated embodiment, each end of the torque rods 102 is provided with a bore into which a bushing assembly 10 according to the present disclosure may be inserted. The holes 37 at the end portions 35 of the inner metal bar pins 30 (FIG. 1) may receive fasteners or the like to secure each bushing assembly 10 (and, hence, the associated end of the torque rod 102) to an axle bracket 104 or mounting bracket 106.

While this invention has been described with reference to several illustrative embodiments, it will be understood that this description shall not be construed in a limiting sense. Rather, various changes and modifications can be made to the illustrative embodiments without departing from the true spirit and scope of the invention, as defined by the following claims. Furthermore, it will be appreciated that any such changes and modifications would be recognized by those skilled in the art as an equivalent to one or more elements recited in the following claims, and shall be covered by such claims to the fullest extent permitted by law.

The invention claimed is:

1. A vehicle suspension bushing assembly comprising:
   a deformable metal vehicle suspension sleeve having an inner diameter;
   an elastomeric vehicle suspension housing secured to an outer surface of said deformable metal vehicle suspension sleeve; and
   a metal vehicle suspension bar pin press fit into said deformable metal vehicle suspension sleeve, wherein
   the metal vehicle suspension bar pin comprises a central section and an end portion extending beyond each end of the central section,
   the central section of the metal vehicle suspension bar pin includes a plurality of radially extending contact surfaces which bear against the inner diameter of the deformable metal vehicle suspension sleeve,
   the metal vehicle suspension bar pin has a greater outer diameter at the contact surfaces than at any other portion, and
   the outer diameter of the contact surfaces is greater than or substantially equal to the inner diameter of the deformable metal vehicle suspension sleeve.

2. The vehicle suspension bushing assembly of claim 1 wherein said elastomeric vehicle suspension housing is bonded to said deformable metal vehicle suspension sleeve.

3. The vehicle suspension bushing assembly of claim 1 wherein said metal vehicle suspension bar pin has a central section with four contact surfaces.

4. The vehicle suspension bushing assembly of claim 3 wherein two of the contact surfaces are in full contact with said deformable metal vehicle suspension sleeve and two of the contact surfaces are only in line contact with the deformable metal vehicle suspension sleeve.

5. The vehicle suspension bushing assembly of claim 1 wherein said metal vehicle suspension bar pin has a central section with three contact surfaces.

6. The vehicle suspension bushing assembly of claim 1 wherein said metal vehicle suspension bar pin has a central section with five contact surfaces.

7. The vehicle suspension bushing assembly of claim 1 wherein said metal vehicle suspension bar pin has a central section with six contact surfaces.

8. The vehicle suspension bushing assembly of claim 1 wherein the end portions of said metal vehicle suspension bar pin extend beyond each end of said deformable metal vehicle suspension sleeve.

9. The vehicle suspension bushing assembly of claim 1 wherein each of said end portions of said metal vehicle suspension bar pin has a hole through it.

10. The vehicle suspension bushing assembly of claim 1 wherein said deformable metal vehicle suspension sleeve is circular in cross section.

11. The vehicle suspension bushing assembly of claim 1 wherein said deformable metal vehicle suspension sleeve is non-circular in cross section.

12. The vehicle suspension bushing assembly of claim 1 wherein the central section of said metal vehicle suspension bar pin is comprised of voids bounded by the radially extending contact surfaces.

13. A method of assembling said vehicle suspension bushing assembly of claim 1 by press fitting said metal vehicle suspension bar pin into said deformable inner metal vehicle suspension sleeve.

14. The vehicle suspension bushing assembly of claim 1 wherein the deformable metal vehicle suspension sleeve has a length substantially equal to the length of the contact surfaces of the metal vehicle suspension bar pin.

15. The vehicle suspension bushing assembly of claim 1 wherein at least one of the contact surfaces is differently shaped than another one of the contact surfaces.

16. The vehicle suspension bushing assembly of claim 1 wherein a greater portion of one of the contact surfaces bears against the deformable metal vehicle suspension sleeve than another one of the contact surfaces.

17. A vehicle suspension bushing assembly consisting of:
   a deformable metal vehicle suspension sleeve having an inner diameter;
   an elastomeric vehicle suspension housing secured to an outer surface of said deformable metal vehicle suspension sleeve; and
   a metal vehicle suspension bar pin press fit into said deformable metal vehicle suspension sleeve, wherein
   the metal vehicle suspension bar pin comprises a central section and an end portion extending beyond each end of the central section,
   the central section of the metal vehicle suspension bar pin includes a plurality of radially extending contact surfaces which bear against the inner diameter of the deformable metal vehicle suspension sleeve,
   the metal vehicle suspension bar pin has a greater outer diameter at the contact surfaces than at any other portion, and
   the outer diameter of the contact surfaces is greater than or substantially equal to the inner diameter of the deformable metal vehicle suspension sleeve.

18. A vehicle suspension mountable to a vehicle frame comprising:
   a plurality of suspension components;
   a plurality of mounting brackets; and
   a vehicle suspension bushing assembly comprising
      a deformable metal vehicle suspension sleeve having an inner diameter;
      a vehicle suspension housing secured to an outer surface of said deformable metal vehicle suspension sleeve; and
      a metal vehicle suspension bar pin press fit into said deformable metal vehicle suspension sleeve, wherein
         at least a portion of the outermost surface of the vehicle suspension bushing assembly is comprised of an elastomeric material,
         the metal vehicle suspension bar pin comprises a central section and an end portion extending beyond each end of the central section,
         the central section of the metal vehicle suspension bar pin includes a plurality of radially extending contact surfaces which bear against the inner diameter of the deformable metal vehicle suspension sleeve, the metal vehicle suspension bar pin has a greater outer diameter at the contact surfaces than at any other portion, the outer diameter of the contact surfaces is greater than or substantially equal to the inner diameter of the deformable metal vehicle suspension sleeve, and the vehicle suspension bushing assembly is attached to one of said plurality of suspension components, one of said plurality of mounting brackets, and/or said vehicle frame.

19. The vehicle suspension of claim 18, wherein each end portion of the metal vehicle suspension bar pin includes a hole for attaching the vehicle suspension bushing assembly to one of said plurality of suspension components, one of said plurality of mounting brackets, and/or said vehicle frame.

20. The vehicle suspension of claim 18, wherein one of said plurality of suspension components comprises a torque rod, the vehicle suspension bushing assembly being inserted into the torque rod.

* * * * *